(12) United States Patent
Mooneyham (10) Patent No.: US 8,925,000 B2
(45) Date of Patent: Dec. 30, 2014

(54) SYSTEMS AND METHODS FOR ASSOCIATING RATINGS WITH MEDIA AND FOR PROVIDING RATINGS-BASED PARENTAL CONTROLS

(75) Inventor: Mark Randall Mooneyham, Folsom, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1445 days.

(21) Appl. No.: 12/198,628

(22) Filed: Aug. 26, 2008

(65) Prior Publication Data

US 2013/0174194 A1 Jul. 4, 2013

(51) Int. Cl.
*H04N 7/16* (2011.01)
*H04N 7/167* (2011.01)

(52) U.S. Cl.
USPC .............................. 725/28; 725/25

(58) Field of Classification Search
None
See application file for complete search history.

(56) References Cited

U.S. PATENT DOCUMENTS

| | | | | |
|---|---|---|---|---|
| 5,973,683 | A * | 10/1999 | Cragun et al. | 715/719 |
| 6,199,047 | B1 * | 3/2001 | Dimino et al. | 705/7.29 |
| 7,437,772 | B1 * | 10/2008 | Thenthiruperai et al. | 726/30 |
| 7,720,463 | B2 * | 5/2010 | Marsico | 455/410 |
| 2006/0242309 | A1 * | 10/2006 | Damick et al. | 709/229 |
| 2006/0244845 | A1 | 11/2006 | Craig et al. | |
| 2007/0204287 | A1 * | 8/2007 | Conradt et al. | 725/28 |
| 2008/0172689 | A1 * | 7/2008 | Feder et al. | 725/28 |
| 2009/0282438 | A1 * | 11/2009 | White | 725/44 |
| 2010/0269130 | A1 * | 10/2010 | Gupta | 725/28 |

OTHER PUBLICATIONS

"Extensible Metadata Platform," http://en.wikipedia.org/wiki/Extensible_Metadata_Platform, downloaded from the Internet on Apr. 4, 2008.
"How ClearPlay Works," http://www.clearplay.com/Movies/HowClearPlayWorks.aspx, downloaded from the Internet on Aug. 21, 2008.
"ClearPlay—Parental Control," http://www.clearplay.com/About.aspx, downloaded from the Internet on Aug. 21, 2008.
"Motion Picture Association of America," http://www.mpaa.org/filmratings.asp downloaded from the Internet on Jun. 5, 2008.
"V-Chip—Wikipedia, the free encyclopedia," http://en.wikipedia.org/wiki/V_chip, downloaded from the Internet on Jul. 23, 2008.

* cited by examiner

*Primary Examiner* — Nasser Goodarzi
*Assistant Examiner* — Fred Peng
(74) *Attorney, Agent, or Firm* — Kilpatrick Townsend & Stockton LLP (57) ABSTRACT

Certain embodiments provide an identifier in a piece of media content that can be used to reference ratings information from another location, such as from a ratings repository. When the media content is accessed by a viewing client, the identifier can be retrieved from the piece of media content and used to retrieve a rating from a ratings repository. A rating may also be included in the media content itself to ensure that at least one rating is available even if accessing a rating from the remote repository is not possible, for example, due to lack of network connectivity. The viewing client can use a rating to control use of the media content. One embodiment allows a user on a client device such as a computer or television consumption device to set rating controls that restrict the media content that can be played at the device.

21 Claims, 4 Drawing Sheets

```
┌─────────────────────────────────────────────┐
│ IDENTIFYING A MEDIA IDENTIFIER FOR A PIECE OF MEDIA │
│                                         310 │
└─────────────────────────────────────────────┘
                      │
┌─────────────────────────────────────────────┐
│  SENDING A REQUEST FOR A RATING TO A MEDIA RATING │
│                   INDEX                      │
│                                         320 │
└─────────────────────────────────────────────┘
                      │
┌─────────────────────────────────────────────┐
│   RECEIVING A RATING ASSOCIATED WITH THE MEDIA │
│     IDENTIFIER FROM THE MEDIA RATING INDEX   │
│                                         330 │
└─────────────────────────────────────────────┘
                      │
┌─────────────────────────────────────────────┐
│   CONTROLLING CONSUMPTION OF THE PIECE OF MEDIA │
│               BASED ON THE RATING            │
│                                         340 │
└─────────────────────────────────────────────┘
```

FIGURE 3

```
┌─────────────────────────────────────────────┐
│  DETERMINING A MEDIA IDENTIFIER FOR ASSOCIATION │
│              WITH A PIECE OF MEDIA           │
│                                         410 │
└─────────────────────────────────────────────┘
                      │
┌─────────────────────────────────────────────┐
│  ASSOCIATING THE MEDIA IDENTIFIER WITH THE PIECE OF │
│     MEDIA BY INCORPORATING OR PRESERVING A   │
│   REFERENCE TO THE MEDIA IDENTIFIER IN THE PIECE OF │
│                    MEDIA                     │
│                                         420 │
└─────────────────────────────────────────────┘
                      │
┌─────────────────────────────────────────────┐
│  PROVIDING A RATING AND THE MEDIA IDENTIFIER FOR │
│  STORAGE IN A MEDIA RATING INDEX, THE MEDIA RATING │
│   INDEX PROVIDING ACCESS TO RATINGS ASSOCIATED │
│            WITH PIECES OF MEDIA CONTENT      │
│                                         430 │
└─────────────────────────────────────────────┘
```

FIGURE 4

RECEIVING A FIRST RATING ASSOCIATED WITH A PIECE OF MEDIA FROM A FIRST MEDIA RATING ENTITY
510

STORING A FIRST ENTRY IN A MEDIA RATING REPOSITORY, THE FIRST ENTRY COMPRISING THE FIRST RATING, A MEDIA IDENTIFIER ASSOCIATED WITH THE PIECE OF MEDIA, AND INFORMATION ABOUT THE FIRST MEDIA RATING ENTITY
520

RECEIVING A SECOND RATING ASSOCIATED WITH THE PIECE OF MEDIA FROM A SECOND MEDIA RATING ENTITY
530

STORING A SECOND ENTRY IN THE MEDIA RATING REPOSITORY, THE ENTRY COMPRISING THE SECOND RATING, THE MEDIA IDENTIFIER, AND INFORMATION ABOUT THE SECOND MEDIA RATING ENTITY
540

RESPONDING FROM THE MEDIA RATING REPOSITORY TO A REQUEST FOR ONE OR MORE RATINGS ASSOCIATES THE MEDIA IDENTIFIER
550

FIGURE 5

SYSTEMS AND METHODS FOR ASSOCIATING RATINGS WITH MEDIA AND FOR PROVIDING RATINGS-BASED PARENTAL CONTROLS

FIELD

Embodiments of the present disclosure relate generally to ratings for media content, including but not limited to ratings for movies, television shows, music, radio content, and Internet content, among other things.

BACKGROUND

Various rating and other systems help viewers control what content is available to their children. The Motion Picture Association of America provides a rating system for movie content that typically assigns a letter rating (G, PG, R, and X) to a movie. Parents have used these ratings, which may be displayed on the outside of a video cassette, other media container, or within the media content itself, to limit their children's access to certain content. In addition, new U.S. television sets have V-chip technology that uses the vertical blanking interval in a television signal to receive a special code indicating a show's score according to a numerical rating system for violence, sex, and language. If the piece of content's rating is outside the level configured as acceptable on a particular television, it is blocked. In these and other contexts, existing rating systems are generally fixed and unchangeable both in the number/categories of ratings and in the particular ratings assigned to any particular piece of content. Existing systems are thus inflexible with respect to changes over time, differences with respect to geographic location, and/or differences with respect to particular user preferences, among other things.

SUMMARY

Certain embodiments described herein provide methods and systems for associating ratings with media and for providing ratings-based parental controls. Several embodiments provide methods of accessing a rating associated with a piece of media. Such methods may involve identifying a media identifier for a piece of media. The media identifier, which is generally unique enough to distinguish the piece of media from other pieces of media, may be identified using a reference to the media identifier retrieved from the piece of media. Certain methods further comprise sending a request for a rating to a media rating index and receiving a rating from the media rating index. The media identifier may have been included in the request and used to identify the rating in the media rating index.

Certain methods further comprise controlling consumption of the piece of media based on the received rating. For example, a client viewing device may use the received rating to prevent consumption of the piece of media based on the received rating exceeding a rating threshold. Certain embodiments involve receiving information in addition to the rating, such as information about the entity that assigned the rating, information related to a location associated with the rating, and information related to a date the rating was associated with the piece of media, among other things. Multiple ratings may also be received for a given piece of media, providing additional information to a content viewer. A piece of media may also include an indication of a default rating, that may be used, for example, when access to a rating repository is not available.

Several embodiments of the present disclosure provide methods of associating a rating with a piece of media. Such methods may comprise determining a media identifier for association with a piece of media and associating the media identifier with the piece of media by incorporating or preserving a reference to the media identifier in the piece of media. The methods may comprise providing a rating and the media identifier for storage in a media rating index. The media rating index may provide access, for example through a network, to the rating and other ratings associated with pieces of media content.

Several embodiments of the present disclosure provide methods of providing a repository of media ratings. Such methods may comprise receiving a first rating associated with the piece of media from a first media rating entity and receiving a second rating associated with the piece of media from a second media rating entity. The method may comprise storing entries in a media rating repository or index for these ratings so that the ratings can be retrieved and/or used by others. An entry in the media rating repository may comprise, for example, a rating, a media identifier associated with the rated piece of media, and information about the media rating entity that provided the rating. The media rating repository may respond to a request for ratings by providing one or more ratings associated with a given media identifier and/or information about the source of the rating, e.g., whether the rating was from the first rating entity, the second rating entity, or elsewhere. Similarly, a media rating repository may receive a request for a rating requesting only ratings from a specified rating source for a given piece of media and can respond accordingly.

In other embodiments, a computer-readable medium (such as, for example, random access memory or a computer disk) comprises code for carrying out these methods. Several embodiments relate to a content control system that comprises a media identifier module for identifying a media identifier for a piece of media using a reference to the media identifier retrieved from the piece of media. The system may further comprise a rating request module for sending a request for a rating to a media rating index and a control module for receiving a rating from the media rating index. The rating may be identified by the media rating index using the media identifier. The rating may be used to control consumption of the piece of media based on the received rating.

These embodiments are mentioned not to limit or define the disclosure, but to provide examples of embodiments to aid understanding thereof Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Certain embodiments involve providing an identifier (e.g., a number) in a piece of media content that can be used to reference ratings information stored at another location, such as at a ratings repository. For example, a piece of media content may have a fingerprint that uniquely identifies the piece of media content. When the media content is accessed by a viewing client, that fingerprint can be assessed and used to retrieve a rating from the ratings repository. A rating may also be included in the media content itself to ensure that at least one rating is available even if accessing a rating from a remote repository is not possible, for example, due to lack of network connectivity. The viewing client can use the rating to control use of the media content. One embodiment allows a user on a client device such as a computer or television consumption device to set rating controls that restrict the media content that can be played. For example, a user may specify a threshold of 5 on a 1-10 rating scale so that content rated 6 or higher cannot be played by the viewing client. If someone, such as a child, attempts to access a piece of media content with a rating of 7, the viewing client will not play the media.

Using a repository to track one or more ratings for a piece of media content provides a variety of benefits and capabilities. For example, it provides the ability to revise a rating as societal standards and ratings schemes change over time. Thus, a rating in a repository need not be static or generalized for everyone. Ratings from multiple and diverse sources may be used. For example, users of ratings may be interested in the media content ratings provided by one or more specific rating authorities, particular individuals, and/or by the filmmakers themselves and other original media creators. A content creator could place his or her own ratings for a piece of media content in a ratings repository. Ratings repositories can receive ratings from multiple ratings providers, allowing a user to select one or more preferred rating providers in accordance with the user's preferences. A rating provider could also provide a rating based on collaborative audience input or votes. A rating repository may accept ratings from multiple authorities and individuals and provide averaged, blended, or other composite ratings. A rating repository may also accept and/or keep track of ratings based on rating categories. Exemplary rating categories of the virtually unlimited categories that might be used include a sex rating category, a violence rating category, a language rating category, an adult theme category, a horror rating category, a United States rating category, and an Australia rating category.

A parental control, provided on a media viewing client or elsewhere, could be implemented to use a particular rating scheme, rating authority, composition of ratings, use a particular rating category or categories and/or in accordance with an other user rating preference. A user may elect to control content consumption using one or more ratings provided by rating providers having certain characteristics, e.g., use the average of all rating providers having profiles identifying the rating provider as having a child between the ages of 3 and 6 years old. It will be understood that there are a variety of other ways for a user to use content control features with a content repository, including techniques that involve identifying ratings provided by one or more rating authorities, identifying ratings provided by individuals and entities having certain characteristics, and/or controlling the consumption of media content using one or more ratings.

Generally, a client application or viewing client may comprise functionality to identify a media identifier from a piece of media, functionality to use that identifier to retrieve rating information, and/or functionality to allow a user to set parental controls. A viewing client could be a set-top box, computer, mobile phone, or any other device for consuming media content. A viewing client could also be a website and thus need not be a client actually on a piece of hardware in a viewer's hands or at a viewer's location. A viewing client may also utilize profiles for different users and/or require that a user enter a password to access a particular profile to gain access to content restricted to other profiles.

A viewing client may provide a user interface that facilitates configuring one or more content controls at the viewing client device. For example, the interface may ask the user "how much sex are you willing to see on a scale of 1 (none) to 10 (explicit sex)" and receive the user's selection. As rating systems evolve, the content control interface may prompt the user for additional information such as how much violence, adult themes, and adult language the user is willing to see. The user may be able to set different ratings thresholds for different categories of ratings. The user may also select a source of ratings, with respect to both the physical computing device that provides the rating (e.g., the rating repository) and/or the actual entity that has assigned the rating (e.g., the rating provider). For example, a user could switch from using a given ratings repository to another ratings repository. Another example is a user switching between different ratings sources providing ratings on a given ratings repository, e.g., from ABC, Inc. rating authority to the DEF, Inc. rating authority. Certain embodiments provide and/or faciliatate flexibility with respect to the use of rating authorities and repositories, and thus creates choice, competition, and control over ratings.

Illustrative Network Configuration

Figure 1:
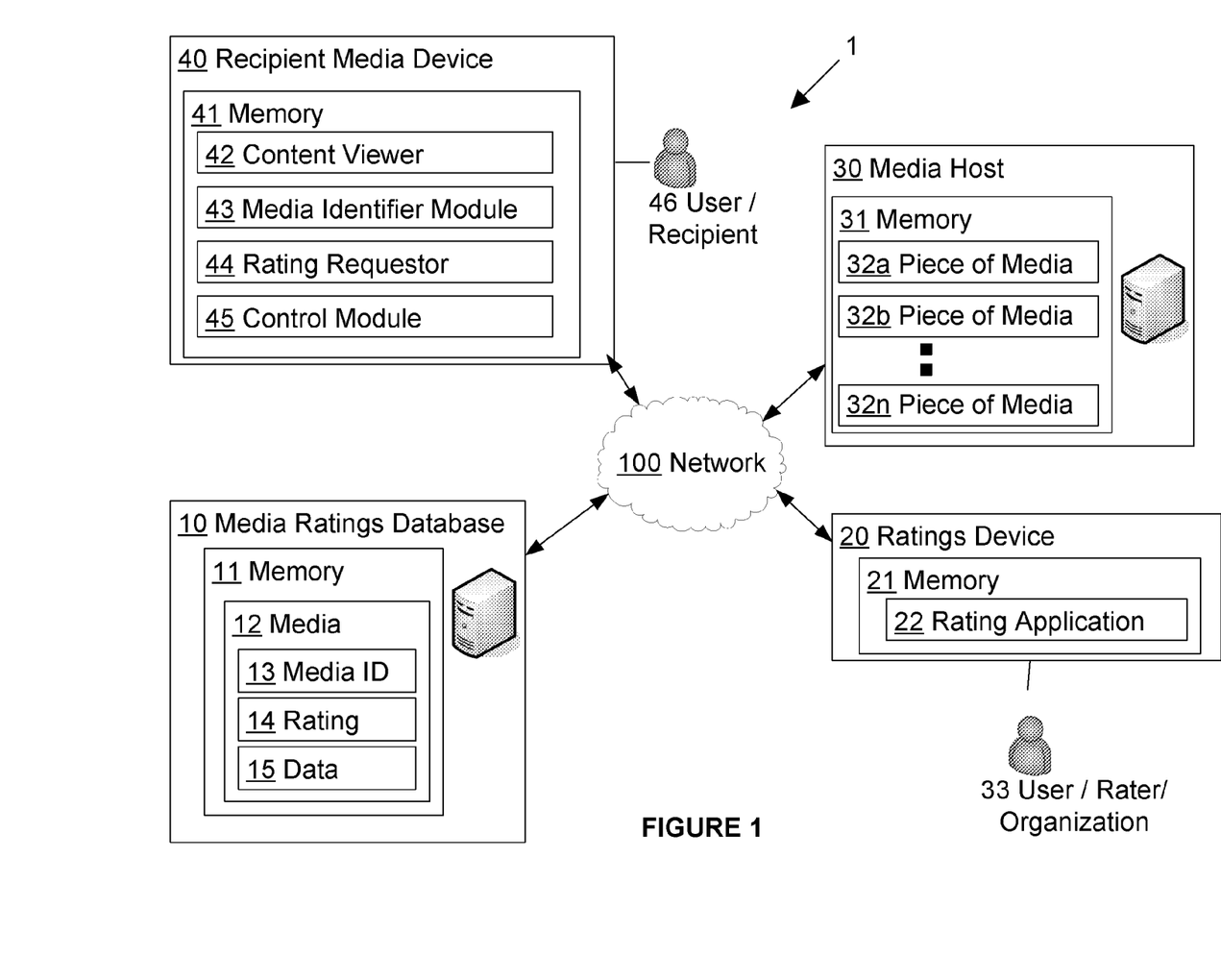
FIG. 1 is a system diagram illustrating an illustrative network environment according to certain embodiments.

Referring now to the drawings in which like numerals indicate like elements throughout the several Figures, FIG. 1 is a system diagram illustrating an illustrative network environment according to certain embodiments. Other embodiments may be utilized. The environment 1 shown in FIG. 1 comprises a wired or wireless network 100 connecting various network devices 10, 20, 30, 40. Applications that execute on each of the devices 10, 20, 30, 40 are shown as functional or storage components residing in memory 11, 21, 31, 41 on the respective devices. As is known to one of skill in the art, such applications may be resident in any suitable computer-readable medium and execute on any suitable processor. For example, the network devices 10, 20, 30, 40 shown each may comprise a computer-readable medium such as a random access memory (RAM) 11, 21, 31, 41, coupled to a processor that executes computer-executable program instructions stored in memory 11, 21, 31, 41. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A media ratings database 10 provides storage of media ratings. For example, the media ratings database 10 may comprise a media component 12 stored in its memory. Individual records in the media component 12 may comprise a media identifier 13, a rating 14, and additional data 15. The media identifier 13 may be used when looking up or otherwise retrieving a rating and/or other data for a given piece of media associated with a media identifier. More than one record may be associated with a given media identifier. For example, a record may indicate that a particular movie was given a rating of "R" by one media rating authority and a separate record may indicate that that movie was given a rating of "PG" by another rating authority. A rating can have any suitable format or characteristics. Ratings within the media ratings database 10 may relate to different rating scales or no rating scale at all. For example, a first rating authority may have rated a movie "R" using a scale similar to the scale used by the Motion Picture Association of America, while another rating authority may have rated the movie "9" on its own scale of 1 to 10. Yet another rating authority may have provided a rating "Nudity" to indicate that the movie contains nudity. Ratings may correspond to a particular category. For example, a movie may have a rating of 8 out of 10 in a nudity category and a 3 out of 10 in a violence category.

A media ratings database may include additional information that is associated with a given rating. For example, a record in a media index may include a media identifier 13, a rating 14, and some additional data 15 that is associated with the rating. The additional data can relate to a variety of things. As examples, the additional data may identify a scale on which the rating is based, the source of a rating, or the date a rating was given, among other things. The source of a rating may be a particular rating authority, individual, group, electronic system, survey, or any other source or combination of sources.

The media ratings database 10 may act as a media rating repository accepting and storing ratings provided by one or more rating providers and providing ratings and other information from within the repository to requesting entities. A media ratings database may further comprise functionality to select and/or compile ratings to provide tailored information to a requesting entity. For example, the media ratings database may be asked to provide an average rating for a given piece of media, the average rating comprising an average of ratings in the repository that were provided by sources having certain characteristics, e.g., all Christian affiliated rating providers or all rating providers located in San Jose, Calif.

A media host 30 stores one or more pieces of media 32a-32n in its memory 31 and provides these pieces of media to media consuming entities such as recipient media device 40. The terms "media," "media content," and "piece of media," are used interchangeably herein and refer to any media or other content that can be viewed, listened to, experienced, or otherwise consumed by a media or content consumer. Media is generally capable of being transmitted, streamed, or sent though a network or otherwise to another party such as to a requesting party on the Internet or to a television program subscriber. A media host 30 may, for example, send a piece of media through a network 100 in response to receiving a request from a requesting party over that same network 100 or another network.

A recipient media device 40 is generally capable of consuming a piece of media, for example, by playing the content of the piece of media for a user/recipient 46. A recipient media device 40 may be capable of receiving television media content through television channels, streamed content, and downloaded content, among other forms of media content. A recipient media device 40 may comprise a content viewer 42 in its memory that functions as an application that allows a piece of media to be viewed or otherwise consumed. Alternative viewing devices may, of course, be used to play back, deliver, and/or serve media content. Examples include a device with Adobe® Flash® software, a device using the Adobe® AIR® platform, a device using an Adobe® Acrobat® product, a set top box, or other media consuming fixed or portable devices. A viewing device could be a server that is serving out the media.

The recipient media device 40 may further comprise a media identifier module for examining a piece of media and finding or otherwise determining a media identifier that is embedded or preserved within the media. For example, a media identifier module 40 may identify and read a watermark on a received piece of media. The media identifier module 40 may identify a media identifier from this watermark. As another example, the media identifier module 40 may examine a fingerprint of a piece of media to identify the piece of media's media identifier.

The recipient media device 40 may further comprise a rating requester module 44 that uses a media identifier retrieved by the media identifier module 43 to request a rating associated with the piece of media. A rating requestor module 44 may send a message or other request to a media ratings database 10 or other repository through network 100 requesting a rating associated with an identified piece of media. The piece of media for which the rating is sought may be identified to the media rating repository, for example, by providing the media identifier in the request.

The recipient media device 40 may further comprise a control module 45 that controls the consumption of a piece of media on, for example, the content viewer module 42. A control module 45 may use a rating retrieved from a piece of media content and/or a rating retrieved from a ratings database to limit, prevent, or allow consumption of a given piece of media. For example, if a rating of "C" is retrieved for a piece of media and the control module 45 is configured to prevent access to media having a rating of "C", the control module may prevent the content from being retrieved and/or consumed at the recipient media device 40. The control module 45 may provide functionality that allows a user to specify control parameters such as blocked ratings, rating thresholds, and other ratings-based content consumption restrictions. Thus, it may be used as, among other things, a parental control device that a parent may use to restrict access to certain categories of content based on ratings given to the content. It may also restrict, prevent, or otherwise limit the consumption of media content having no rating. For example, it may restrict playing of a piece of content until it has been verified that the piece of content is associated with an approved rating.

A rating device 20 may be used in the system 1 shown in FIG. 1 to facilitate the creation of a rating record for a piece of media. The ratings device 20 may, for example, comprise a rating application that allows a reviewer of a piece of content to assign a rating to a given piece of content. The rating application may comprise a media identifier module (not shown) similar to media identifier module 43, that can recognize a media identifier associated with a piece of media. If a piece of media does not have a media identifier, the module may create a new media identifier for the piece of media content. Such a new identifier may be, for example, created by being requested from the media ratings database 10 or from another source. A media identifier may be created at or around the time of the creation of the piece of media or at any time thereafter.

Once a media identifier is identified or created for a piece of media, the ratings application 22 allows a rating provider, such as a rating authority, an individual, a content creator, or any other organization, person, or entity to submit a rating to the media ratings database that will be associated with the piece of media content. Such a rating may be stored in the media rating database in any suitable manner, including but not limited to, as a record that identifies the media identifier and the specified rating. Such a record may also include additional information about the rating provider and any other associated information.

Figure 2:
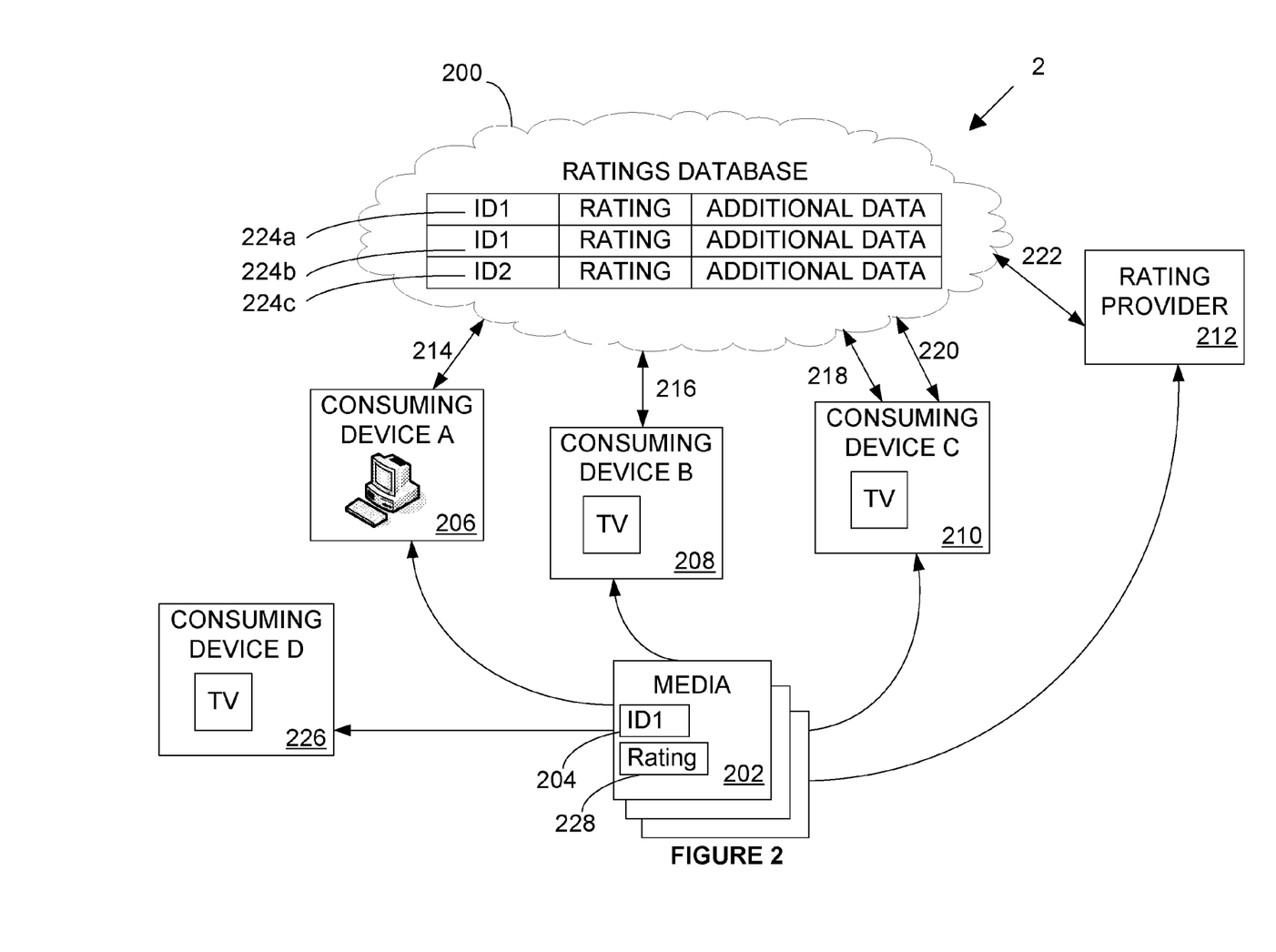
FIG. 2 is a workflow diagram illustrating an illustrative use of a ratings database according to certain embodiments.

FIG. 2 is a workflow diagram illustrating an illustrative use of a ratings database 200 according to certain embodiments. A piece of media 202 is provided to consuming device A 206, consuming device B 208, consuming device C 210, and consuming device D 226. Consuming device A is a computer. Consuming device B 208 and consuming device C 210 are television viewing devices. Consuming device A 206, consuming device B 208, and consuming device C 210 each receive the piece of media 202 and derive the media identifier 204 from the piece of media 202. These consuming devices 206, 208, 210 then initiate a request-response communication 214, 216, 218 with a ratings database, requesting any ratings associated with the media identifier 204. Since the media identifier 202 corresponds to the "IDI" value of several records 224a, 224b in the ratings database 200, these consuming devices 206, 208, 210 receive the ratings from those records 224a, 224b as part of the request response communication 214, 216, 218. These consuming devices 206, 208, 210 can display or otherwise provide these ratings to a content consumer, use the ratings in a content control context (e.g., by comparing a rating to a rating threshold or rating restriction and restricting content consumption accordingly), or otherwise use the retrieved ratings.

FIG. 2 also illustrates consumption device C further communicating with the ratings database in a provide-rating communication 220. For example, a content consumer using consuming device C 210 may have viewed the piece of content 202 and decided to provide his or her own rating for the piece of content 202. The provide-rating communication 220, for example, may comprise a request to add a record in the ratings database that identifies the media identifier 204, a rating value provided by the consumer using consumer device C 210, and information about the source of the rating, e.g., identifying the name of the user who provided the new rating.

Similarly, rating provider 212 may receive a copy of a piece of media 202 and send a provide-rating communication 222 to the ratings database. The rating provider 212 need not have requested other ratings that may be associated with the piece of media content. In some cases, a rating provider 212 may be the first to provide a rating for a given piece of media. In such cases, the ratings database or any other source may provide a media identifier to be incorporated into or preserved within the piece of media content.

FIG. 2 further illustrates consuming device D 226 receiving the piece of media content 202. Since consuming device D 226 is not in communication with the ratings database 200, consuming device D 226 retrieves a rating, which may be referred to as a default rating 228, from within the piece of media content 202. Consuming device D 226 can display or otherwise provide this rating 228 to a content consumer, use the rating 228 in a content control context (e.g., by comparing the rating 228 to a rating threshold or rating restriction and restricting content consumption accordingly), or otherwise use the rating 228.

Illustrative Methods of Accessing a Rating Associated with a Piece of Media

Figure 3:
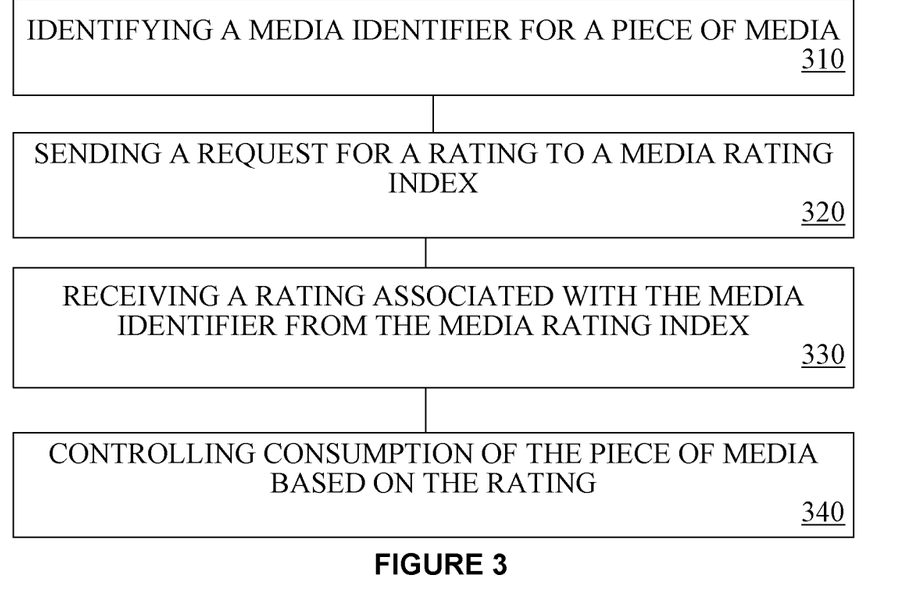
FIG. 3 is a flow chart illustrating a method of accessing a rating associated with a piece of media, according to certain embodiments.

FIG. 3 is a flow chart illustrating a method of accessing a rating associated with a piece of media, according to certain embodiments. The method may involve controlling consumption of the piece of media based on the rating. For purposes of illustration only, the elements of this method are described with respect to a particular implementation and with respect to exemplary components illustrated in FIG. 1. A variety of other implementations are also possible.

The method shown in FIG. 3 comprises identifying a media identifier for a piece of media, as shown in block 310. Generally, a media identifier is sufficiently unique to allow a piece of media to be distinguished from other pieces of media. Thus, a media identifier is usually different (for practical purposes) from media identifiers associated with other pieces of media. A media identifier may be a large number, for example.

The media identifier may be identified using a reference to the media identifier retrieved from the piece of media. For example, a module, such as the media identifier module 43 shown in FIG. 1, may examine the piece of media and find or otherwise determine a media identifier based on the piece of media. The reference to the media identifier may, of course, be the media identifier itself, which may be embedded or preserved within the media in a manner that the media identifier module can recognize. For example, a media identifier module 40 may identify and read a watermark on the piece of media. The media identifier module 40 may identify a media identifier from this watermark. As another example, a visible mark on the media, such as a white square on a red background or a blue circle on a green background may be used to determine the piece of media's media identifier. The media identifier may have been included in embedded metadata of the piece of media. As another example, the media identifier module 40 may examine a fingerprint of the piece of media to identify the piece of media's media identifier. Because techniques such as fingerprinting may not change the media (e.g., a fingerprint may be derived from the existing media through analysis of pre-existing characteristics such as the color or brightness changes between frames), the piece of media may have been given a media identifier such as a derived fingerprint without changing the piece of media itself The method shown in FIG. 3 further comprises sending a request for a rating to a media rating index, as shown in block 320. The request for the rating may comprise the media identifier and/or an identification of a rating source or rating scheme. For example, a rating requester module, such as the rating requester module 44 shown in FIG. 1 may request a rating from a media rating index such as the media ratings database 10 of FIG. 1, or any other repository or source of media ratings. If a media consuming or receiving device does not have the ability to access a rating from a separate repository or other data source, the device may retrieve a rating from the piece of media itself For example, the rating may be retrieved from embedded metadata of the piece of media.

The method shown in FIG. 3 comprises receiving a rating associated with the media identifier from the media rating index, as shown in block 330. The rating may have been identified using the media identifier sent in the request for the rating. For example, a ratings repository or index could use the media identifier to find rating records for the piece of media. If a request comprises an identification of a rating source, the received rating may comprise a rating associated with the specified rating source. In addition to a rating, information about the rating may be received. Such information about the rating may include, but is not limited to, information related to the entity that assigned the rating, information related to a location associated with the rating, and information related to a date the rating was associated with the piece of media. For a given piece of media multiple ratings associated with the media identifier may be received.

The method shown in FIG. 3 comprises controlling consumption of the piece of media based on the rating, as shown in block 340. This may involve, for example, preventing consumption of the piece of media based on the rating exceeding a rating threshold. Consumption control may be performed by a consumption control module such as consumption control module 45 shown in FIG. 1. Such a module may also allow a user to specify rating thresholds, rating blocks, and other content control parameters. Content control parameters may specify a particular rating source, rating category, rating repository, rating scale, and/or any other rating feature or user specified parameter.

Illustrative Methods of Associating a Rating with a Piece of Media

Figure 4:
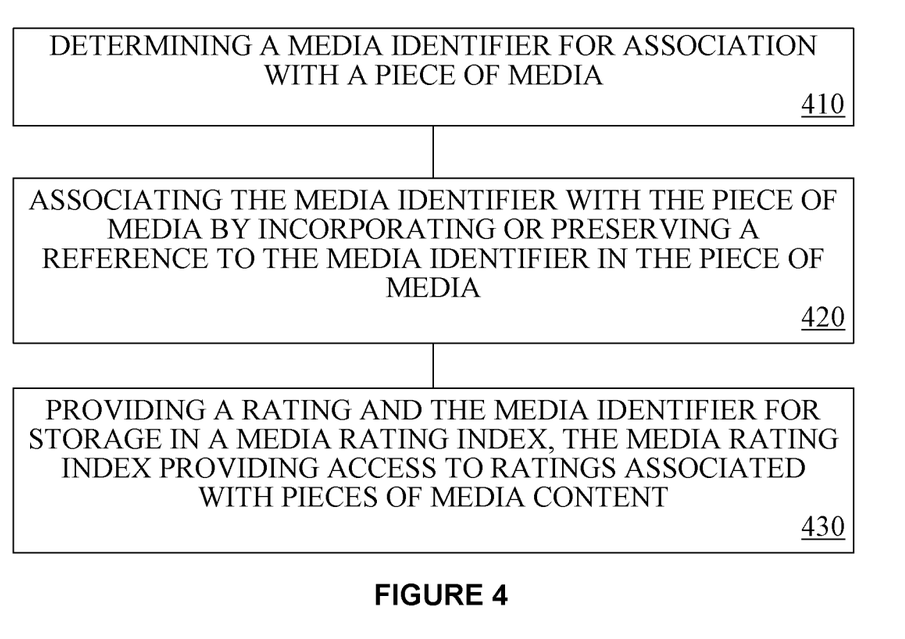
FIG. 4 is a flow chart illustrating a method of associating a rating with a piece of media, according to certain embodiments.

FIG. 4 is a flow chart illustrating a method of associating a rating with a piece of media, according to certain embodiments. For purposes of illustration only, the elements of this method are described with respect to a particular implementation and with respect to exemplary components illustrated in FIG. 1. A variety of other implementations are also possible.

The method shown in FIG. 4 comprises determining a media identifier for association with a piece of media, as shown in block 410. The media identifier will generally be different from media identifiers associated with other pieces of media. For example, a rating device such as rating device 20 shown in FIG. 1 may be used to facilitate the creation of a rating for a piece of media. The rating application 22 may comprise a media identifier module (not shown) similar to media identifier module 43, that can recognize a media identifier associated with a piece of media. If a piece of media does not have a media identifier, the module may create a new media identifier for the piece of media content. Such a new identifier may be, for example, requested from a media ratings database 10 or other repository.

The method shown in FIG. 4 comprises associating the media identifier with the piece of media by incorporating or preserving a reference to the media identifier in the piece of media, as shown in block 420. For example, the media identifier may be added as embedded metadata, a watermark, as a visible mark, or may be preserved as a fingerprint or other feature.

The method shown in FIG. 4 comprises providing a rating and the media identifier for storage in a media rating index, as shown in block 430. The media rating index may be a database or other repository and will generally provide access to ratings associated with pieces of media content. A rating device such as rating device 20 shown in FIG. 1 may be used to provide the rating and the media identifier for storage in a media rating index. A ratings application 22 may allow a rating provider, such as a rating authority, an individual, a content creator, or any other organization, person, or entity to submit a rating that will be associated with the piece of media content to the media rating index. Such a record may also include additional information about the rating provider and other associated information.

Illustrative Methods of Providing a Repository of Media Ratings

Figure 5:
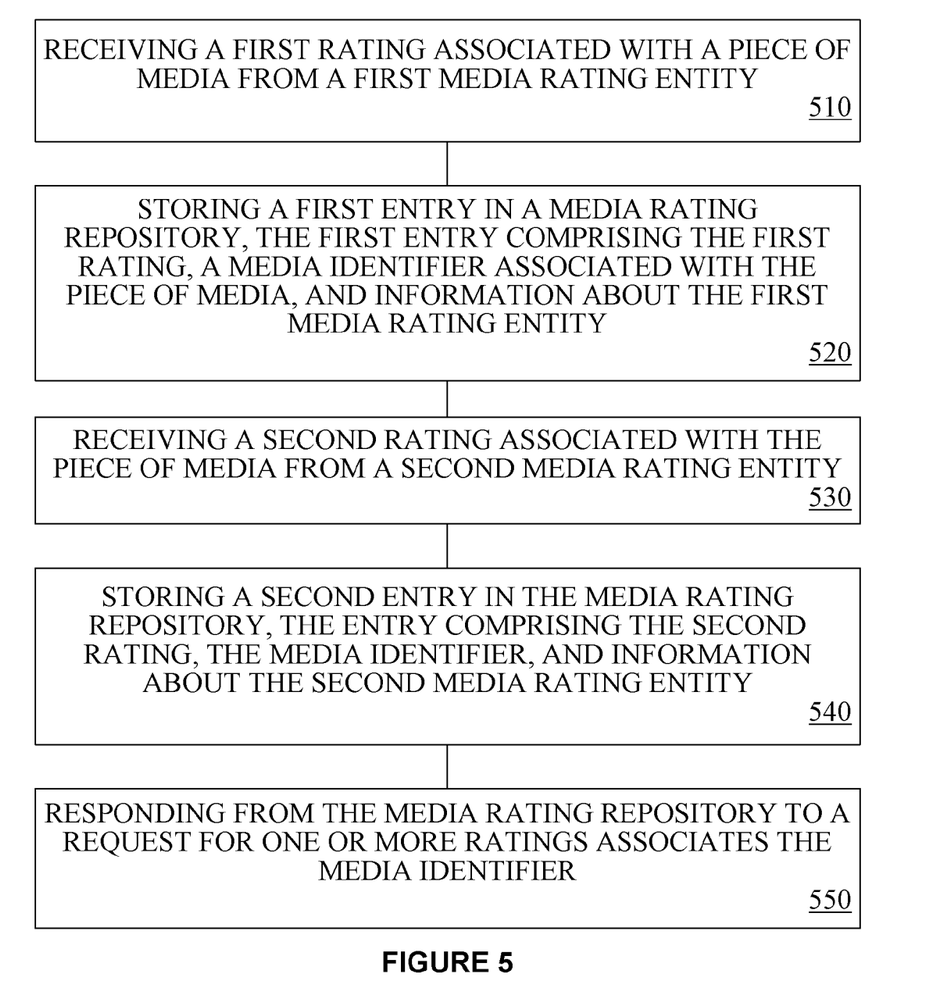
FIG. 5 is a flow chart illustrating a method of providing a repository of media ratings, according to certain embodiments.

FIG. 5 is a flow chart illustrating a method of providing a repository of media ratings, according to certain embodiments. For purposes of illustration only, the elements of this method are described with respect to a particular implementation and with respect to exemplary components illustrated in FIG. 1. A variety of other implementations are also possible.

The method shown in FIG. 5 comprises receiving a first rating associated with the piece of media, the first rating from a first media rating entity, as shown in block 510. Rating device 20 shown in FIG. 1 illustrates an exemplary ratings device that a media rating entity could utilize to create and/or submit a rating.

The method shown in FIG. 5 comprises storing a first entry in a media rating repository, as shown in block 520. For example, the first entry may comprise the first rating, a media identifier associated with the piece of media and different from media identifiers associated with other media, and information about the first media rating entity. The media ratings database shown in FIG. 1 is an exemplary media ratings repository that could be used to store the first entry and other entries for the same and other pieces of media.

The method shown in FIG. 5 comprises receiving a second rating associated with the piece of media, the second rating from a second media rating entity, as shown in block 530. The method shown in FIG. 5 also comprises storing a second entry in the media rating repository, as shown in block 540. This entry may comprise the second rating, the media identifier, and information about the second media rating entity.

The method shown in FIG. 5 comprises responding from the media rating repository to a request for one or more ratings associates the media identifier, as shown in block 550. This may involve providing from the first rating, the second rating, and any other rating associated with the media identifier or otherwise specified by the request. The repository may also provide information about the first media rating entity and information about the second media rating entity in response to the request.

Illustrative Methods of Providing Configuration Flexibility

Certain embodiments provide implementations which are flexible with respect to configuration. For example, a system may provide flexibility with respect to the number and identification of rating entities that are used in configuring a parental control. For example, when a parent or guardian chooses a rating entity and threshold levels, the user software may receive a data table (e.g., an XML schema) from a remote server that defines the rating entities that are currently available. Data fields in the table can define the characteristics for each entity, including the number of individual ratings categories and their names (e.g., "violence", "nudity" etc). In a particular example, information from such a table can be used to determine to which media rating index (e.g., which entity) a request for a rating should be sent. The system can thus provide a significant amount of flexibility and extensibility with respect to the use of rating entities and, in many cases, hard-coding rating entity information in the client can be avoided.

General

Certain embodiments relate to an index of media identifiers that is available over the Internet. Certain embodiments relate to generic ratings provided by a rating entity. These are merely illustrative. For example, embodiments also relate to a rating based on collaborative filtering of other viewers' ratings and/or a rating that is selected based on a self-selected viewer type or on some algorithmic weighting system which evaluates each viewer's rating's deviation from the mean over time. Other embodiments can involve other non-traditional rating entities, including rating entities that provide a meta-rating comprised of an average of ratings from multiple rating entities.

In short, the techniques for storing and using ratings, content controls and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

In addition, with respect to the computer implementations depicted in the Figures and described herein, certain details, known to those of skill in the art have been omitted. For example, software tools and applications that execute on each of the devices and functions performed thereon are shown as functional or storage components on the respective devices. As is known to one of skill in the art, such applications may be resident in any suitable computer-readable medium and execute on any suitable processor. For example, computing and media consuming devices each may comprise a computer-readable medium such as a random access memory (RAM), coupled to a processor that executes computer-executable program instructions stored in memory. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

While the network 100 may comprise the Internet, in other embodiments, other networks, such as an intranet, or no network may be used. Moreover, methods may operate within a single device. Devices can be connected to a network 100 as shown. Alternative configurations are of course possible. The devices may also comprise a number of external or internal devices such as a mouse, a CD-ROM, DVD, a keyboard, a remote control, a display, or other input or output devices. Examples of devices are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media content consuming programs.

That which is claimed:

1. A method of accessing a rating associated with a piece of media, comprising:
    identifying, via a device, a media identifier for a piece of media, the media identifier identified using a reference to the media identifier retrieved from the piece of media, the media identifier different from media identifiers associated with other pieces of media, wherein the reference to the media identifier is embedded metadata, a watermark, or a fingerprint in the piece of media;
    sending, via the device, a request for a rating to a media rating index, the request for the rating comprising the media identifier, wherein the request for the rating further comprises a requirement that the rating be provided using only ratings from rating providers having certain characteristics; and
    receiving, at the device, a rating associated with the media identifier from the media rating index, the rating identified using the media identifier, wherein the rating received is an average of ratings by rating providers having the certain characteristics.

2. The method of claim 1 further comprising controlling consumption of the piece of media based on the rating.

3. The method of claim 2, wherein controlling consumption of the piece of media based on the rating comprises preventing consumption of the piece of media based on the rating exceeding a rating threshold.

4. The method of claim 1, wherein the request comprises an identification of a rating scheme and the rating threshold comprises a value on the rating scheme.

5. The method of claim 1, wherein the request comprises an identification of a rating source and the rating threshold relates to a rating scheme used by the rating source.

6. The method of claim 1, further comprising receiving information about the rating, the information about the rating selected from the group consisting of:
    information related to the entity that assigned the rating;
    information related to a location associated with the rating; and
    information related to a date the rating was associated with the piece of media.

7. The method of claim 1, wherein receiving the rating associated with the media identifier from the media rating index comprises receiving multiple ratings associated with the media identifier.

8. The method of claim 7 further comprising receiving information about a source of each of the multiple ratings.

9. The method of claim 1 further comprising selecting the media rating index using a data table received from a remote server, the data table identifying currently available rating entities that provide access to media rating indexes.

10. The method of claim 1 wherein the request for the rating further comprises a requirement that the rating be provided using only ratings from rating providers having certain characteristics.

11. A method comprising:
    identifying, via a device, a media identifier for a piece of media, the media identifier identified using a reference to the media identifier retrieved from the piece of media, the media identifier different from media identifiers associated with other pieces of media;
    determining if the device has an ability to access a rating for the piece of media online from a separate data source;
    identifying, via the device, the rating for the piece of media, wherein the rating is identified differently based on whether the device has the ability to access the rating online from the separate data source, wherein identifying the rating comprises:
  if the device is online, sending, via the device, a request for the rating to a media rating index, the request for the rating comprising the media identifier, and receiving the rating associated with the media identifier from the media rating index, the rating identified using the media identifier; and
  if the device is offline, retrieving, via the device, the rating from the piece of media.

12. The method of claim 11 further comprising controlling consumption of the piece of media based on the rating.

13. The method of claim 12, wherein controlling consumption of the piece of media based on the rating comprises preventing consumption of the piece of media based on the rating exceeding a rating threshold.

14. The method of claim 11, wherein the request further comprises an identification of a rating scheme and the rating threshold comprises a value in the rating scheme.

15. The method of claim 11, wherein the request further comprises an identification of a rating source and the rating threshold relates to a rating scheme used by the rating source.

16. A method of associating a rating with a piece of media, the method comprising:
  determining, via a device, a media identifier for association with a piece of media, the media identifier different from media identifiers associated with other pieces of media;
  associating, via the device, the media identifier with the piece of media by incorporating or preserving a reference to the media identifier in the piece of media, wherein the reference to the media identifier is embedded metadata, a watermark, or a fingerprint in the piece of media; and
  providing a rating and the media identifier for storage in a media rating index, the media rating index providing access to ratings associated with pieces of media content, wherein an average of stored ratings having certain characteristics is provided in response to a request that identifies the media identifier and a requirement to use only ratings from rating providers having the certain characteristics.

17. The method of claim 16, further comprising providing a second rating and the media identifier for storage in the media rating index.

18. The method of claim 16, wherein the media rating index comprises a database.

19. A system comprising:
  a media identifier module for identifying a media identifier for a piece of media using a reference to the media identifier retrieved from the piece of media, the media identifier different from media identifiers associated with other pieces of media, wherein the reference to the media identifier is embedded metadata, a watermark, or a fingerprint in the piece of media;
  a rating request module for sending a request for a rating to a media rating index, the request for the rating comprising the media identifier and a requirement to use only ratings from rating providers having the certain characteristics; and
  a control module for receiving a rating associated with the media identifier from the media rating index, the rating identified using the media identifier and controlling consumption of the piece of media based on the rating, wherein the rating is an average of ratings having the certain characteristics.

20. A non-transitory computer-readable medium on which is encoded program code, the program code comprising:
  program code for identifying a media identifier for a piece of media, the media identifier identified using a reference to the media identifier retrieved from the piece of media, the media identifier different from media identifiers associated with other pieces of media, wherein the reference to the media identifier is embedded metadata, a watermark, or a fingerprint in the piece of media;
  program code for sending a request for a rating to a media rating index, the request for the rating comprising the media identifier, wherein the request for the rating further comprises a requirement that the rating be provided using only ratings from rating providers having certain characteristics;
  program code for receiving a rating associated with the media identifier from the media rating index, the rating identified using the media identifier, wherein the rating received is an average of ratings by rating providers having the certain characteristics; and
  program code for controlling consumption of the piece of media based on the rating.

21. A method comprising:
  identifying, via a device, a media identifier for a piece of media, the media identifier identified using a reference to the media identifier retrieved from the piece of media, the media identifier different from media identifiers associated with other pieces of media;
  sending, via the device, a request for a rating to a media rating index, the request for the rating comprising the media identifier, wherein the request for the rating further comprises a requirement that the rating be provided using only ratings from rating providers having certain characteristics; and
  receiving, at the device, a rating associated with the media identifier from the media rating index, the rating identified using the media identifier,
  wherein the rating received is an average of ratings by rating providers having the certain characteristics.

* * * * *